United States Patent [19]

Papadopoulos et al.

[11] Patent Number: 5,184,420
[45] Date of Patent: Feb. 9, 1993

[54] COMPUTERIZED FERTILIZER INJECTION SYSTEM

[75] Inventors: Athanasios P. Papadopoulos, Windsor; Eric M. Labbate, Leamington; Nicola Liburdi, Windsor, all of Canada

[73] Assignee: Labbate Climate Control System Inc., Leamington, Canada

[21] Appl. No.: 284,439

[22] Filed: Dec. 14, 1988

[51] Int. Cl.$^5$ ............................................. A01G 31/00
[52] U.S. Cl. ................................................................. 47/62
[58] Field of Search ..................... 47/1.01, 62, 79, 59

[56] References Cited

U.S. PATENT DOCUMENTS

| Re. 31,023 | 9/1982 | Hall, III ................................ 47/1 R |
| 3,578,431 | 5/1971 | Ingestad et al. ........................ 47/62 |
| 3,797,740 | 3/1974 | Kah . | |
| 4,178,716 | 12/1979 | Harper et al. ........................... 47/62 |
| 4,341,327 | 7/1982 | Zietz . | |
| 4,669,217 | 6/1987 | Fraze ...................................... 47/59 |
| 4,815,042 | 3/1989 | Pratt ...................................... 414/21 |

FOREIGN PATENT DOCUMENTS

| 142989 | 11/1984 | European Pat. Off. . |
| 2602759 | 1/1976 | Fed. Rep. of Germany . |
| 3331818 | 3/1985 | Fed. Rep. of Germany . |
| 1558581 | 9/1976 | United Kingdom . |

OTHER PUBLICATIONS

Hort.Science, vol. 23 (5) Oct. 1988–Computerized Individual-nutrient Fertilizer Injector: The System–W. Bauerle et al.
Plant, Cell and Environment (1987) 10, 375–381; "A Microcomputer-Controlled System for the Automatic Measurement and Maintenance of Ion Activities in Nutrient Solutions During Their Absorption by Intact Plants in Hydroponic Facilities"; A. D. M. Glass et al.
Biosensors 1 (1985) 369–397; "The Development of Sensors for Hydroponics" W. J. Albery et al.

*Primary Examiner*—David A. Scherbel
*Assistant Examiner*—Michele A. Van Patten
*Attorney, Agent, or Firm*—Riches, McKenzie & Herbert

[57] ABSTRACT

A computer controlled system for delivering of a fertilizing water stream to crop beds and varying the nutrient content of the water stream to customize it for each crop bed. The nutrient feed system utilizes injection pumps with pre-set dose volumes and a computer control which permits the pumps to be stroked at different frequencies based on the flow of a water stream to accurately control the nutrients injected and to permit accurate switching from injecting nutrients of one pre-set menu to those of another pre-set menu.

18 Claims, 3 Drawing Sheets

COMPUTERIZED FERTILIZER INJECTION SYSTEM

SCOPE OF THE INVENTION

This invention relates to automated irrigation and liquid fertilization of crops and more particularly to a system and method for automated mixing and delivering of water streams having variable nutrient content.

BACKGROUND OF THE INVENTION

It is known to inject liquid fertilizers into water streams to be fed to crops.

One known type of injector is sold under the ANDERSON trade mark. This Anderson injector system has a water meter which produces a hydraulic pulse for every unit volume of the water stream. The hydraulic pulse is used to simultaneously cause a number of dosing pumps to stroke once whereby each injects one of their respective doses of liquid fertilizer into the water stream. Each pump has a calibration dial to vary the volume of the dose of the liquid injected by that pump. In use, the calibration dials are pre-set and each pump will inject one dose of liquid for each unit volume of water to achieve the desired proportions and concentrations in the resultant water stream.

The Anderson injector system suffers the disadvantage that varying of the relative proportions of the nutrients requires manual manipulation of the calibration dials. The calibration dials suffer the disadvantage that they imprecisely set the amount of fertilizer liquid injected. Inaccuracies involved in respect of use of the calibration dials are sufficiently large that precise injection of desired doses cannot be ensured. The calibration dials are also difficult to adapt to automated control and change.

Other known fertilizer injector systems require pre-mixing of liquid fertilizer in two tanks and then injecting selected doses from each tank into a water stream. This has the disadvantage that the relative proportions of the nutrients are to a large extent pre-set by their relative proportions in the two tanks.

Known fertilizer injector systems suffer the disadvantage that they are not adapted to facilitate automated precise control and change of injection requirements.

In growing of crops in greenhouses, it is known to control the climate in the greenhouse with a view to achieving desired crop growth and productivity. It is known to monitor greenhouse environment conditions such as air temperature, relative humidity, air carbon dioxide concentration and luminescence and to provide automated control for at least some of these factors as by use of computers. Automated climate control systems for greenhouses do not have the capability to automatically vary the application of fertilizers to the crops on an element by element basis.

SUMMARY OF THE INVENTION

It is an object of the present invention to at least partially overcome the disadvantages of previously known devices by providing a fertilizer injection system adapted for precise control and variation of nutrient proportions and concentrations in a resultant water stream.

Another object is to provide a computer control nutrient feeding system which automatically controls and varies the nutrients provided in a water stream to different crop beds so that the nutrients being fed may be customized for each crop bed.

Another object is to provide an automated feed system for control and variation of nutrients fed to crop beds having regard to factors relating to climate, growing medium, season and crop development.

Another object is to provide a system which provides accurate nutrient control and permits nutrients to be fed and records kept on single element feeding.

Accordingly, in one of its aspects, the present invention provides a feed system for selective automated delivery to a crop bed of a fertilizing water stream by the use of a number of dosing pumps with each dosing pump associated with a separate nutrient tank containing concentrated liquid fertilizers whereby the proportions and concentrations of liquid nutrients injected into the water stream may be varied by changing the relative number and timings of doses injected by each pump without changing pre-set volumetric doses for each pump.

In another of its aspects, the present invention provides a feed system for selective automated delivery to a crop bed of a water stream with nutrients therein in controlled, variable proportions and concentrations, comprising:

a plurality of nutrient tank means each supplying concentrated liquid fertilizer containing one or more nutrients in known concentrations, a dosing pump means associated with each tank means to inject into the water stream a pre-set volumetric dose of the liquid fertilizer on each pulse of the pump means, control means monitoring the volumetric flow of said water stream and selectively pulsing each of said dosing pump means to inject quantities of the liquid fertilizer to achieve desired proportions and concentrations of said nutrients in the water stream, said control means including means to vary the proportions and concentrations of the liquid nutrients in the water stream by varying the relative number and timing of pulses of the pump means for each nutrient tank means without changing the pre-set volumetric dose for said pump means.

In another aspect the present invention provides an an automated computer controlled system for a plurality of separate crop beds to mix and feed to each crop bed a water stream containing nutrients customized for each crop bed, said system comprising:

a plurality of nutrient tank means each supplying concentrated liquid fertilizer containing one or more nutrients in known proportions and concentrations, a dosing pump means associated with each tank means to inject into the water stream a preset volumetric dose of the liquid fertilizer on each pulse of the pump means, distribution means to selectively distribute the water stream to individual crop beds, valve means to regulate the input flow of the water stream and to regulate outlet flow of the resultant water stream to individual crop beds, control means monitoring the volumetric flow of said water stream and selectively pulsing each of said dosing pump means to inject quantities of the liquid fertilizer to achieve desired proportions and concentrations of said nutrients in the resultant water stream, said control means including means to vary the proportions and concentrations of the liquid nutrients in the resultant water stream by varying the relative number and timing of pulses of the pump means for each nutrient tank means without changing the pre-set volumetric dose for said pump means, said control means further including means to control said valve means to distribute the resultant water stream to each crop bed customized for the particular crop bed as to preselected time of distribution, volume and proportions and concentrations of the nutrients in the resultant water stream.

In yet another aspect, the present invention provides a computer controlled method of delivering of a water stream to crop beds and varying the nutrient content of the water stream to customize it for each crop bed, the method comprising:

regulating the volumetric flow of a water stream and selectively distributing it to the crop beds, one crop bed at a time, independently pulsing a plurality of dosing pump means to inject into the water stream respective pre-set volumetric doses of a plurality of nutrient containing liquids, and varying by computer control the relative number and timing of pulsing of the pump means for each of said nutrient containing liquids relative to the volumetric flow of the water stream to vary the proportions and concentrations of the nutrients in the resultant water stream for each crop bed without changing the pre-set volumetric doses for the pump means.

The invention provides pulse nutrient feed systems utilizing injection pumps with pre-set dose volumes and controls which permit the pumps to be cycled at different frequencies based on the flow of the feed stream in order to accurately control the nutrients injected and to permit accurate switching from injecting nutrients of one pre-set menu to those of another pre-set menu. Each injector pump pumps a liquid concentrate having a known concentration and proportion of nutrients. With knowledge of such nutrients, the relative amounts of each liquid to be pumped by each pump can be determined.

The system's ability to automatically change the proportions of nutrients in the resultant water stream permits variations of the nutrients fed in relation to numerous factors including climate conditions and plant development.

BRIEF DESCRIPTION OF THE DRAWINGS

Further objects and aspects of the present invention will become apparent from the following description taken together with the accompanying drawings in which.

DETAILED DESCRIPTION OF THE PREFERRED EMBODIMENT

Figure 1:
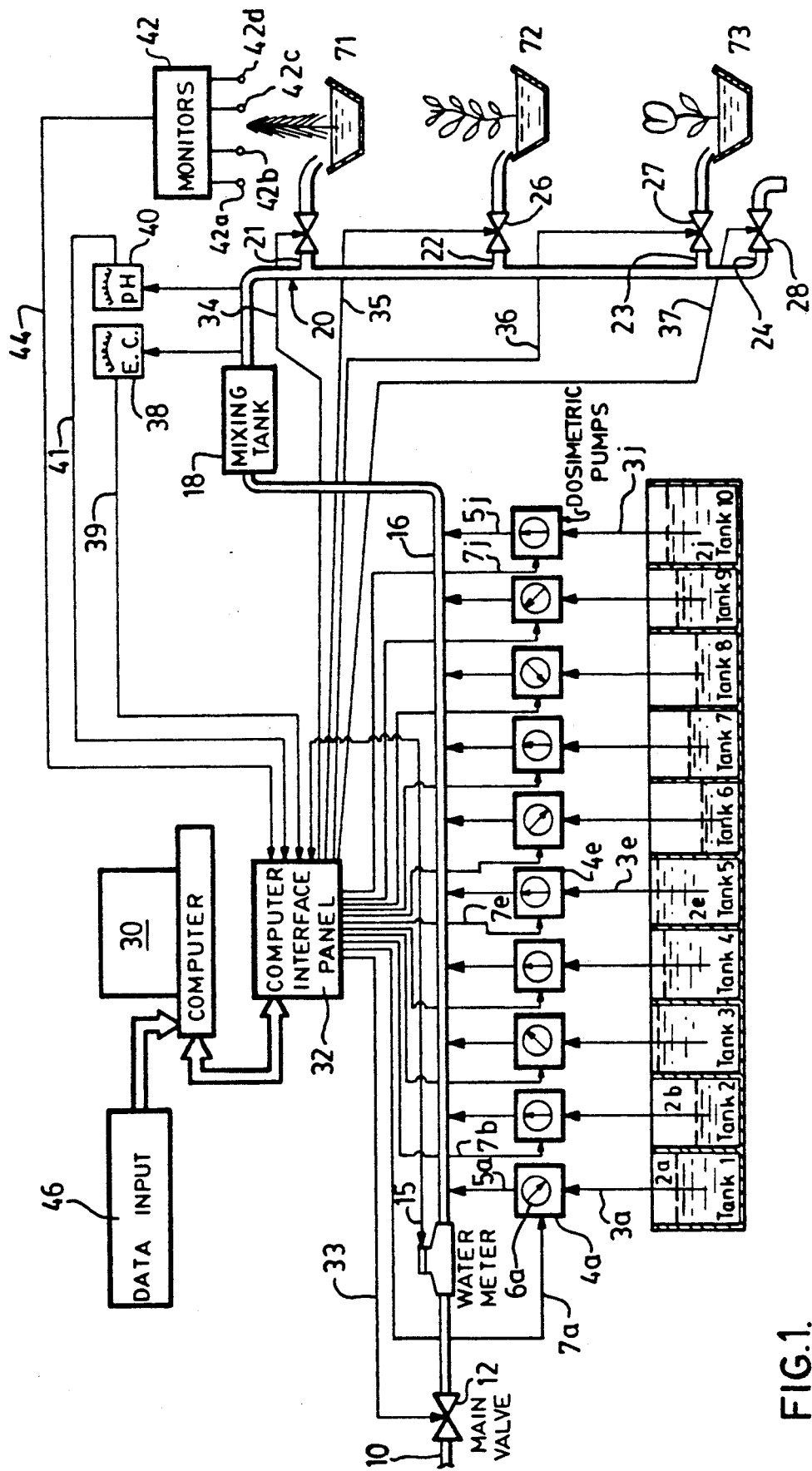
FIG. 1 shows a schematic flow and control diagram showing a first embodiment of an automated feed assembly in accordance with a first embodiment of this invention.

Reference is made first to FIG. 1 schematically showing a flow and control diagram of a first preferred embodiment of the present invention.

A pressurized water stream enters the system at inlet 10 passing through water valve 12, subsequently through water meter 14 and via a conduit 16 to a mixing tank 18 from which it passes to a distribution system including main conduit 20 and branch conduits 21, 22, 23 and 24 each containing an outlet valve 25, 26, 27 and 28. Each of the conduits 21, 22 and 23 permit the resultant water stream to irrigate and fertilize their respective crop bed generally indicated 71, 72 and 73.

A number of liquid supply tanks are provided indicated as $2a$ to $2j$. Each tank has an associated dosimetric pump indicated as $4a$ to $4j$ with respective liquid conduits $3a$ to $3j$ and $5a$ to $5j$ permitting liquid to be drawn from the tank 2 to the pump 4 and then pumped from the pump 4 into conduit 16. Each pump is provided with a calibration dial indicated as $6a$ to $6j$ to set the volumetric dose of one cycle of the pump.

Each dose pump 4 comprises a pump which can be activated so that the pump discharges a single unit volume representing its dose on each activation of the pump. The pump preferably is a type having a piston or diaphragm which moves through a fixed distance on each pulsing or activation of the pump so as to provide a very accurate volumetric dose on each integral pulse of the pump.

Each pump may optionally have calibration means $6a$ serving to set the volumetric dose of each pump. When used in an automatic, computer controlled manner as proposed by the present invention, the calibration means would be set at an approximately desired level and the volumetric dose of the individual pump would be precisely calibrated so as to know more precisely the actual dose of the individual pump.

Each pump is preferably of a type which can be activated to pump one dose by receipt of a simple electrical signal. Each pump has an associated electrical pump input line generally indicated $7a$ to $7j$ to electrically control the pulsing of the pumps.

A computer generally indicated 30 is provided for automated control of the system. For simplification, the computer is indicated as having a computer interface panel 32 to interface with sensors, controls, monitors and data input from the system.

In this regard, lines 7 from the pumps are connected to the computer interface panel 32 to receive electrical signals to selectively pulse the individual pumps. Similarly, control and feedback lines 33 to 37 connect electrically controllable inlet valve 12 and outlet valves 25, 26, 27 and 28, respectively. Sensors such as water meter 14, and electroconductivity meter 38 and pH meter 40 are connected to the computer interface panel by lines 15, 39 and 41, respectively, to provide input to the computer. Numerous other monitors may be provided for input to the computer. These are indicated generally as monitors 42 which may have individual sensors indicated as $42a$, $42b$, $42c$ and $42d$ all to report to the computer interface panel as, for example, by line 44. A data input device indicated as 46 may optionally be provided to input data to the computer.

In operation, the inlet water stream passes through the water meter 12 and then through conduit 16 where quantities of liquids from tanks 2 are injected. The resultant water stream is mixed in the mixing tank and passes onto the distribution system 20 for selective distribution to the individual crop beds.

The relative proportions and concentrations of the nutrients injected into the water stream are accurately controlled by varying the relative number and timing of pulses of each pump 4 for each tank 2. Electrical output lines 7 permit independent control of each pump 4 so as to permit independent injection of doses of the liquids from each tank 2 into conduit 16. The computer 30 controls injection by pumps 2 to provide the resultant water stream of a pre-set nutrient menu by delivery via computer interface panel 32 of timed electrical pulses through lines 7 to each pump 4 as appropriate. Pumps 2 are preferably activated via electrical lines 7 by a dry contact closure. When a pump 2 is to be pulsed, a signal is transmitted from computer 30 to the computer interface panel which preferably energizes a relay for a short period of time passing an electrical signal along line 70 to pump 4 to pulse the pump.

Change from one nutrient menu for the water stream, for example, for delivery to crop bed 71 to a second nutrient menu, for example, for application to crop bed 72, can readily be affected by the computer in that such a change merely requires changing the electrical signals sent along lines 7 to change the relative number and timing of pulses for the pumps 4.

In operation of the system, the volumetric dose of each pump 4 is held constant. The relative timing and frequency of injection of a dose is controlled by computer 30 for each pump 2 to control the relative proportions and quantities of the nutrients in the resultant water stream. During operation, the computer 30 monitors the volumetric flow of the input water stream via water meter 14. Based on the volume of water flowing through water meter 14, the computer can determine the flow rate and the total amount of water that has flowed through the line and this information is then used to determine how much and when to inject liquids from the tanks 2 into the conduit 16.

Mixing tank 18 is downstream from conduit 16 and serves to mix the fertilizer thoroughly so that it will be substantially homogeneous. The mixing tank 18 may comprise a known inline mixer and may have mechanical impellers to assist with mixing.

Downstream from mixing tank 18, both an E.C. meter 38 and a pH meter 40 are provided. The E.C. meter 38 monitors the electroconductivity of the resultant water stream. Electroconductivity is a relative measure of the total quantity of ions dissolved in the water stream. The electroconductivity varies approximately linearly with ion concentration over ranges of concentration normally used in liquid fertilizers. Therefore, in these ranges, the expected electroconductivity of the resultant water stream can be calculated as an arithmetic sum of expected electroconductivities for the water stream if only individual nutrients were added.

The E.C. meter may be of a known type taking readings from an electroconductivity cell placed directly into the resultant water stream. Typically, the electroconductivity cell will be temperature compensated. The E.C. meter is computer interfaceable having an output passing via line 39 to the computer interface panel which preferably provides an analog to digital interface whereby output from the E.C. meter may be read by the computer.

The computer 30 monitors the electroconductivity. If the electroconductivity monitored is outside a preselected range, then the computer 30 will activate an electroconductivity alarm which preferably will shut down the entire system and activate an audio or visual alarm.

The computer 30 also has a warning system to advise an operator when the electroconductivity monitored by the E.C. meter deviates by greater than a pre-set limit from an expected electroconductivity calculated by the computer based on the nutrients the computer has instructed the pumps 4 to inject into conduit 16. This electroconductivity warning system is useful to locate any malfunctions prior to a time when the electroconductivity may deviate so greatly that the system may need to be shut down.

The pH meter 40 receives it readings from a pH probe which is placed into the water stream. The pH of the resultant water stream needs to be controlled within particular limits so as to prevent nutrients which have been injected into the water stream from precipitating out of solution as may disadvantageously deposit in the distribution conduits. One of tanks 2, preferably the first tank 2a, may contain an acid such as phosphoric acid. The computer 30 monitors the pH meter and adjusts the injection of acid from tank 2a via pump 4a so as to maintain the pH within a desired range. The pH meter, like the E.C. meter, has output which extends via line 41 to the computer interface panel 32 effectively serving as an analog to digital board where the output from the pH meter may be read by the computer. The pH meter may preferably operate as a closed-loop feedback system with the computer preferably setting as one of its priorities the maintenance of the pH of the resultant water stream within the desired ranges.

The increases or decreases in injection of acid, when the acid includes one of the nutrients within a nutrient menu for the water feed, such as, for example, phosphorous in phosphoric acid, will require the computer to adjust the relative proportions of other fertilizers added which include phosphorous so that the resultant water stream will have the desired proportions and concentrations of nutrients in the final product. The computer can determine the impact on desired nutrients by the increased or decreased injection of the acid and adjust the relative timing and frequency of injection of other liquid to achieve accurate injection of a desired nutrient menu.

Computer 30 also controls the relative volumetric flow of the water stream and its distribution to the different crop beds. In this regard, the computer monitors the volumetric water flow via water meter 14. Computer 30 can open and close main valve 12 and preferably adjust main valve 12 to permit a desired volumetric flow of the water stream. At the outlet end, computer 30 can control via its computer interface panel, outlet valves 25, 26, 27 and 28. For example, the computer can selectively open one of valves 25, 26 or 27 while closing the remaining valves and thereby permit the resultant water stream to flow to one of the individual crop beds. Through use of the water meter, inlet valve 12 and the outlet valves, the computer can determine and control the total volume of the water stream which is delivered at any particular time to each of the crop beds.

The computer includes an internal clock serving as a timing means whereby the computer can be programmed to automatically irrigate and/or fertilize different crop beds at different times. The nutrient menu for each irrigation and/or fertilization can be set to be different for different crop beds and/or for the same crop beds at different times. Such a feeding schedule for a crop bed involves a number of different factors including the amounts of water and nutrients desired to be applied, desired concentrations and proportions of nutrients in the water streams and the times for delivery of water and nutrients.

Feeding schedules may be preselected and recorded in the memory of the computer for use. The particular feeding schedule may be selected having regard to a number of different factors which can include factors such as the nature of the crop, the nature of the crop bed to be used, the age of the crop and the season of planting.

The feeding schedules may preferably be changed with changes in many factors, including changes in climate, growing medium conditions and crop development. Regarding climate, relevant factors include air temperature, relative humidity of the air and carbon dixoide concentration in the air and atmospheric pressure. Where the crop may be grown outside, these factors would be the atmospheric condition. Where crop beds may be in greenhouses, these factors may be relevant both as to those inside the greenhouse and those of atmospheric outside the greenhouse. Where crop beds are outside, another climate factor will be the rainfall on the crop beds. Hours of sunlight is relevant as is the luminescence or the intensity of light received by the particular crop bed.

Factors relating to soil include the water content, residual nutrient level and acidity. Factors relating to crop development include the age and developmental stage of the plants, their size, their relative growth and their yield.

The system of the present invention advantageously is operated in a manner which permits feeding schedules to be set and changed in relation to data inputted to or monitored by the computer. The computer includes a memory to store data inputted or monitored with such stored data to include historical data on feeding of the crops to date, climate, soil and crop development and the like. This data can then be used having regard to preselected menus and feeding schedules to calculate adjusted menus and feeding schedules. Such calculations can be on the basis of variance of data regarding feeding of crops, climate, soil and crop development from expected or preselected ranges for such data, as for example, on the basis of which the preselected menus and feeding schedules were developed.

Referring to FIG. 1, the preferred embodiments schematically shows monitors 42a, 42b, 42c and 42d to provide monitored data to the computer via computer interface panel 32. Such monitors may, for example, be monitors of factors relating to climate such as air temperature, carbon dioxide concentration and relative humidity which can be readily monitored by automatic monitors and provide their input to the computer interface panel 32. The system also shows as 46 a data input device whereby other data which may be gathered other than by the monitors such as, for example, manual measurements and instruments of crop development stage, size, growth and yield, can be inputted by an operator on a periodic basis to the computer. For example, an operator could weigh the amounts of ripened fruit harvested from a crop bed on each day so as to provide input as to yield.

Based on the data monitored or inputted to the computer, the computer may then in a predetermined manner, calculate advantageous adjusted nutrient menus and feeding schedules.

The present invention has appreciated that an advantageous method of irrigating and fertilizing crops involves the variance of nutrient menus and feeding schedules with variance in conditions of climate, soil and crop development and that advantageous growth of crops in crop beds may be achieved particularly in greenhouses by automated control not only of climate, but also of nutrient menus and feeding schedules having regard to changes of at least some factors of climate, soil and crop development.

Figure 2:
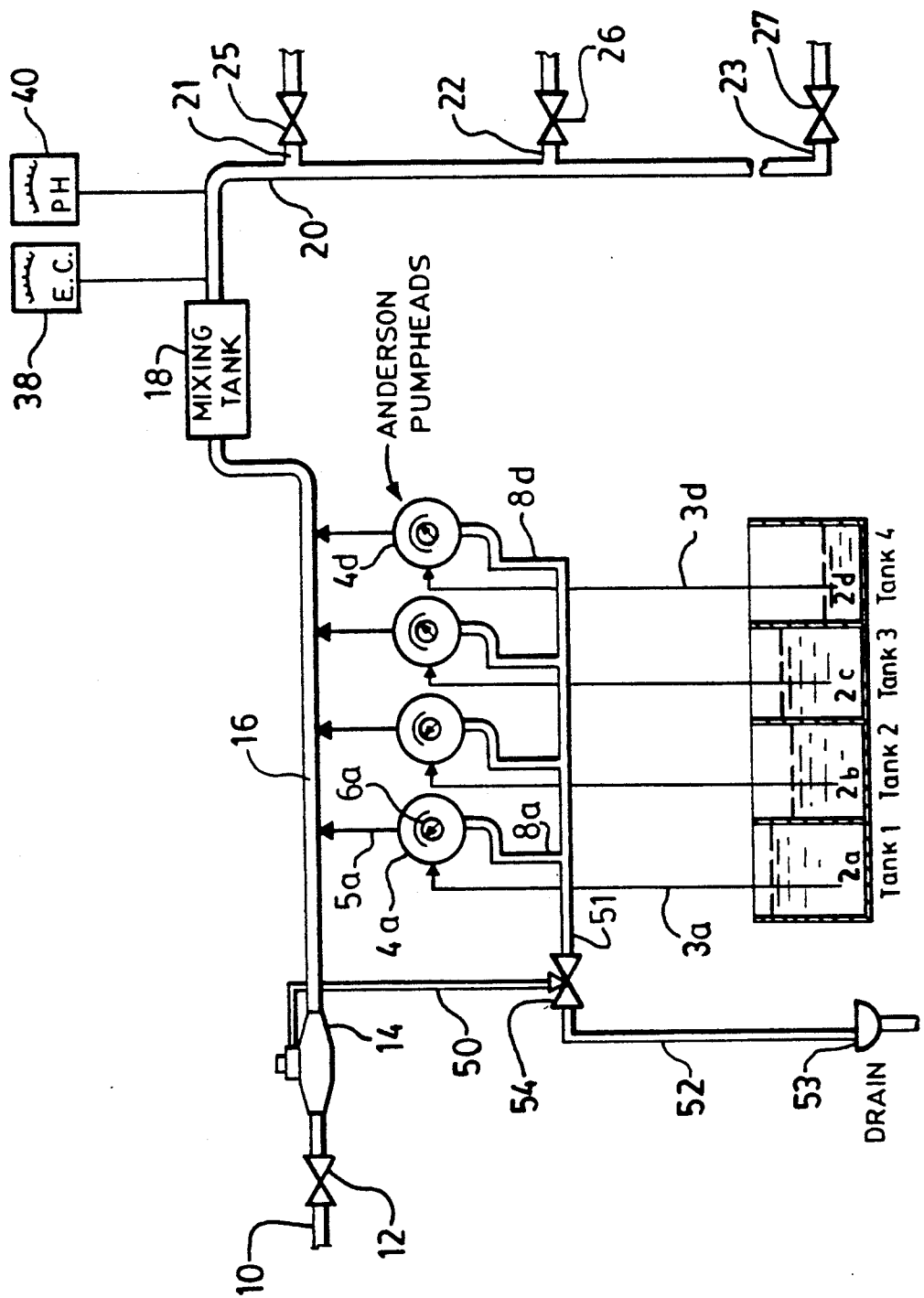
FIG. 2 shows a schematic flow and control diagram of a known Anderson injection feed system.
Figure 3:
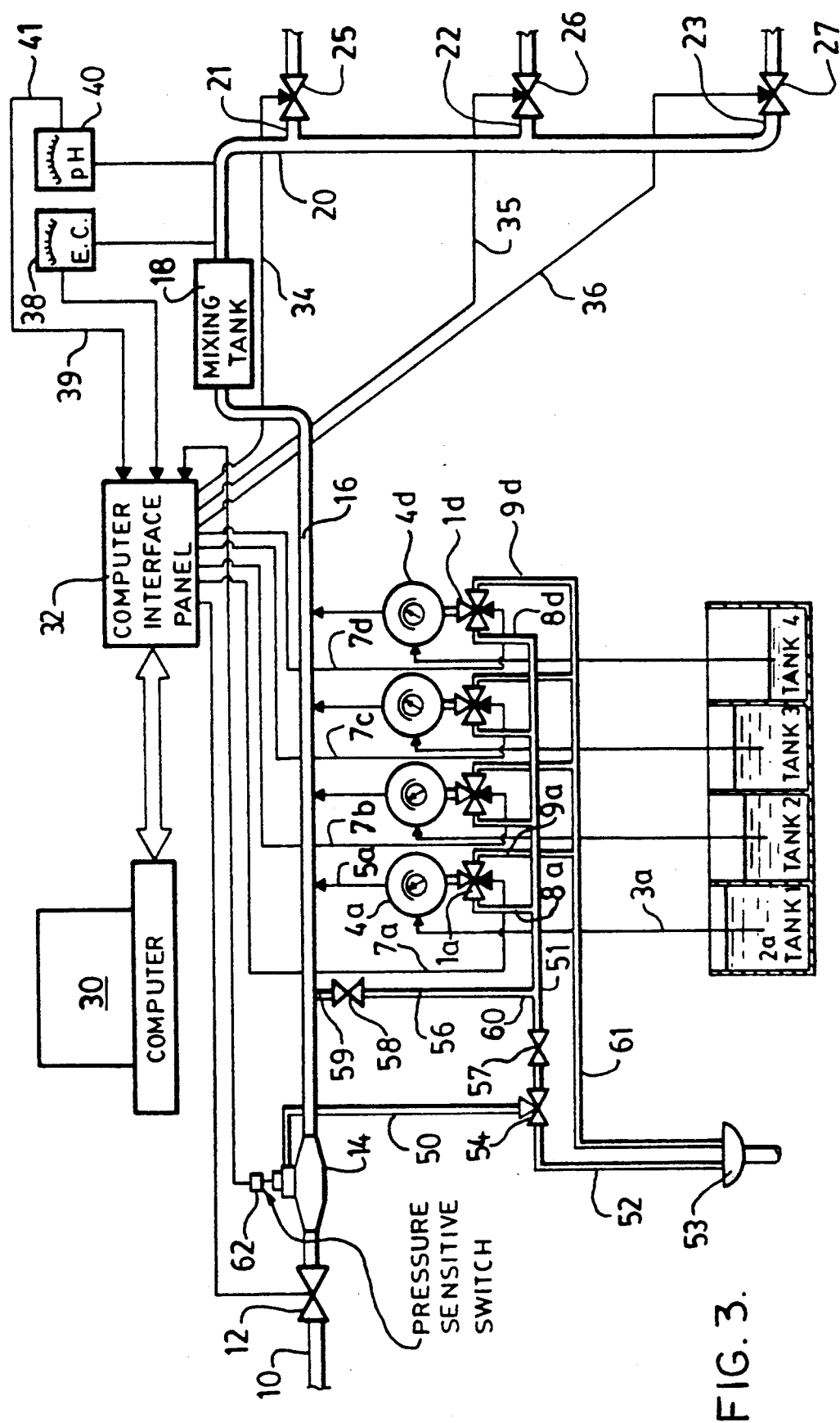
FIG. 3 shows a schematic flow and control diagram showing as a second embodiment of the present invention the flow diagram of FIG. 2 modified in accordance with the present invention.

Reference is now made to FIGS. 2 and 3. FIG. 2 shows a prior art fertilizer injector system utilizing dosimetric pumps typical of those sold under the trade mark Anderson. FIG. 3 shows a modification of the system of FIG. 2 to provide an enhanced system for computer control in accordance with the present invention.

In each of FIGS. 1, 2 and 3, identical reference numerals refer to similar elements.

FIG. 2 shows a known system in which water meter 14 is of a type which provides a hydraulic pulse to line 50 when a unit of water has passed through the water meter by opening line 50 to conduit 16 for a short period of time. Tube 50 is connected by three-way valve 54 to tube 52 extending to drain 53. Tube 50 is also connected by the three-way valve 54 to tube 51 coupled to each of tubes 8a to 8d extending to pumps 4a to 4d, respectively. Valve 54 is of a type so that when line 50 is pressurized by line 50 being open to conduit 16, valve 54 provides communication from line 50 to line 51 and is closed to line 52. When line 50 is not pressurized, valve 54 provides communication from line 51 to 52 and is closed to 50.

The hydraulic pulse from water meter 14 is directed via three-way valve 54 simultaneously to each of the pumps 4. The pumps are of a type whereby this hydraulic pulse activates each pump to stroke once, as by moving a diaphragm, and inject a single dose of liquid from its associated tank into conduit 16. Thus, for each hydraulic pulse from the water meter 14, one dose is simultaneously injected by each of the pumps 4. Each pump is provided with a calibration meter 6a which is manually pre-set to a desired amount. Each pump 4 is pulsed an equal number of times and at the same time to the other pumps so that controlled relative proportion and concentration of the nutrients is merely by use of the calibration dial to set the dose for each pump.

After a pulse from the water meter activates each pump 4, the pressure of the hydraulic pulse is subsequently discharged via a three-way valve 54 to line 52 and drain 53. For example, when meter 14 closes the connection between conduit 16 and line 50, with the result that valve 54 closes to 50 and opens line 51 to line 52 for discharge of water to the drain, as for example, by spring-loaded return of diaphragms of the pumps. Operation of this prior art system is essentially by hydraulics.

FIG. 3 shows the prior art device of FIG. 2 adapted for operation in accordance with the present invention. The modification involves the addition of new conduit line 56 from point 59 on conduit 16 to point 60 on tube 51 and including valve 58. As well, valve 57 is inserted into conduit 51 between three-way valve 54 and point 60. In each inlet line 8 to the pumps, a three-way valve 1a to 1d is inserted with each three-way valve 1 connected to a drain tube 9a to 9d each coupled to a drain pipe 61 extending to drain 53. A pressure sensitive switch 62 is connected to the water meter to sense and report the computer interface panel via line 15 the presence of each hydraulic pulse produced by water meter 14.

For automated operation, valve 58 is open and valve 57 is closed with valve 54 directing flow to drain 53.

Each of the three-way valves 1 comprise a three-way valve which can be switched by electric signals from input lines 7a to 7d from the computer interface panel. Line 51 is pressurized by a line 56 with water from the water stream. By selective operation of the three-way valves 1, a hydraulic pulse can be selectively delivered to each pump 4. After hydraulic pulsing, pressure from the pulse is vented through lines 9 to and pipe 61 drain 53.

In operation, the computer monitors volumetric flow rate of the inlet water stream by monitoring the pulses from meter 14 via pressure switch 62 and line 15. With this information, the computer can then individually selectively inject doses from each of pumps 4a to 4d via their respective lines 7a to 7d selectively operating the three-way valves 1a to 1d. In automated operation, the calibration dial is pre-set at a known dose volume. In accordance with the invention, the nutrient proportions and concentrations in the water stream can be controlled by varying the relative timing and frequency of pulsing of the pumps 4.

The system of FIG. 3 can also be operated manually by closing valve 58 and opening valve 57 with each of three-way valves 1a to 1d adjusted to permit water flow only from line 8 to pump 4. Alternately, valve 58 could be left open and valve 57 left closed and the signal from pressure sensitive switch 62 used to simultaneously activate valves 1 in parallel.

The system and method of the present invention will automatically feed and keep record of the feeding of nutrients to the plants on a single nutrient element by element basis. This is of substantial advantage in research on single element feeding and the effect of individual elements on plant growth and yields. With knowledge of the relative proportions of the individual elements in each of the liquids in tanks 2, the computer can select the relative proportions of the liquids to be injected so as to ensure that the desired nutrient menus are correct on an element by element basis. The ability to precisely and selectively feed different nutrient menus to different crop beds is of substantial assistance in establishing experimental data on the effect of the individual elements on crops.

The use of dose pumps with their dosages fixed throughout operation is a substantial advantage in that the dosages can, prior to use, be accurately calibrated and thereafter do not change. This permits accurate addition of desired volumes of the liquids. In that the system utilizes repeated pulsing of the pumps 4 to inject nutrient liquids, a single sized pump may be used to inject liquid to provide injected liquid in greatly varying proportions compared to the volume of the liquid stream. Thus, one pump may be cycled either once per unit volume of water or numerous times. This permits dosimetric pumps of a single dose size to be useful for inject over a much broader range of injection volume requirements than the dosimetric pump could be accurately used as, for example, in the configuration of FIG. 2 where the relative amounts of each liquid injected depend upon the range of the calibration valves 6 of the pumps 4.

The system in accordance with the present invention is to be understood to permit automated control not only of nutrients added, but also of the amount of irrigation water provided as, for example, by operation of the injector in a mode in which merely water is added without the injection of nutrients. The computer controls when to feed water and/or nutrients and when to stop feeding. The system and method permit feeding at manually inconvenient hours such as at night when feedings which may be of a different nutrient menu than feedings during the day. Multiple crop beds may be fed with different feeding schedules and menus for each.

The invention has been described with a number of particular factors relating to climate, soil and plant development being monitored. Other possible monitors may include a chlorophyll meter installed on the leaf of a plant or plant stress sensor located on the stem of a plant to tell the system when a plant is under stress and may require watering. Many other sensors and monitors could be provided including, for example, a soil moisture probe to start watering when moisture is below a desired physical level or percentage. For example, in a rockwool tray, the level of water could be monitored.

In accordance with the present invention under some applications, spent water from a crop bed could be recycled back to the water inlet. In this situation, the spent water could be monitored as, for example, by an E.C. meter to sense the quantities of nutrients in the return water. Monitors could be provided in each of tanks 2 to indicate the amount of liquid remaining in each tank.

The computer may be structured so that it can receive as a pre-set menu a given weight of each particular elemental nutrient which is desired to be injected in each feeding to a crop bed together with limits on the concentrations of each of these elements in the resultant water stream. From this information, the computer may then on an element by element basis, calculate the relative proportions of the different liquids to be fed from the tank. Elements to be considered include, for example, nitrogen, phosphate, potassium, calcium, magnesium, sulphur, iron, maganese, zinc, copper, boron and magnesium. By assigning more important elements such as nitrogen, phosphorous and potassium with higher priority for accurate addition, by trial and error calculations, the computer can calculate the optimum proportions of each of the liquids in the tanks so as to arrive at the desired nutrient menu. The individual liquids in the tanks 2a are to be chosen to have the element nutrients in different proportions so as to enable variation of the nutrients on an element by element basis by varying the amounts of each liquid injected.

While this invention has been described with reference to preferred embodiments, it is not so limited. Many modifications and variations will now occur to persons skilled in the art. For definition of the invention, reference is made to the appended claims.

We claim:

1. A feed system for selective automated delivery to a crop bed of a water stream with nutrients therein in controlled, variable proportions and concentrations, comprising:

a plurality of nutrient tank means each supplying concentrated liquid fertilizer containing one or more nutrients in known concentrations, a dosing pump means associated with each tank means to inject into the water stream a pre-set volumetric dose of the liquid fertilizer on each pulse of the pump means, control means monitoring the volumetric flow of said water stream and selectively pulsing each of said dosing pump means to inject quantities of the liquid fertilizer to achieve desired proportions and concentrations of said nutrients in the water stream, said control means including means to vary the proportions and concentrations of the liquid nutrients in the water stream by varying the relative number and timing of pulses of the pump means for each nutrient tank means without changing the pre-set volumetric dose for said pump means.

2. A system as claimed in claim 1 including mixing means to mix the injected liquid fertilizer into the water stream.

3. A system as claimed in claim 2 further including mixing means to mix the injected fertilizer into the water stream.

4. A system as claimed in claim 3 wherein said pump means inject the liquid fertilizer into the water stream in the mixing means which is upstream from the distribution means.

5. A system as claimed in claim 4 wherein said mixing means comprises an inline mixer.

6. A system as claimed in claim 5 wherein said distribution means includes a plurality of branch conduits directing the resultant water stream to individual crop beds,
said valve means including inlet valve means to regulate input flow of the water stream, and output valves on each branch conduit to regulate exit of the resultant water stream to the individual crop beds.

7. A system as claimed in claim 6 wherein said control means include water stream metering means to monitor volumetric input flow of the water stream.

8. A system as claimed in claim 7 further include pH monitoring means downstream of said mixing means,
said control means including means to vary the pH of the resultant water stream by varying the relative number and timing of pulses of the pump means for the nutrient tank means, said concentrated liquid fertilizers including at least one acid.

9. A system as claimed in claim 7 further including E.C. meter means to monitor the electroconductivity of the resultant water stream,
said control means including means for calculating a calculated electroconductivity of the resultant water stream based on the volume flow of the water stream and injected volumetric doses of the liquid fertilizers, to compare the calculated electroconductivity with the electroconductivity monitored by the E.C. meter means, and to activate warning means when the difference therebetween is greater than a pre-set limit.

10. A system as claimed in claim 9 wherein said control means further include pH alarm means activated when the pH monitored by the pH meter means is outside a preselected range.

11. A system as claimed in claim 10 further including electroconductivity alarm means activated when the electroconductivity of the resultant feed stream monitored by the electroconductivity metering means is outside a desired range.

12. A system as claimed in claim 2 including:
preselected menus for quantities of water and nutrient proportions and concentrations for each crop bed with time,
means to process and record data regarding said individual crop beds over time,
means to calculate variance of said data from preselected ranges therefore,
means calculating adjusted menus for quantity of water and nutrient proportions and concentrations from said preset menu based on said data variance.

13. A system as claimed in claim 12 including means to monitor or input said data on each crop bed,
said data including at least one of air temperature, relative humidity, luminescence and air carbon dixoide concentration.

14. A system as claimed in claim 13 wherein said data further includes data on at least one of plant size, plant growth and plant yield.

15. An automated computer controlled system for a plurality of separate crop beds to mix and feed to each crop bed a water stream containing nutrients customized for each crop bed, said system comprising:
a plurality of nutrient tank means each supplying concentrated liquid fertilizer containing one or more nutrients in known proportions and concentrations,
a dosing pump means associated with each tank means to inject into the water stream a preset volumetric dose of the liquid fertilizer on each pulse of the pump means,
distribution means to selectively distribute the water stream to individual crop beds,
valve means to regulate the input flow of the water stream and to regulate outlet flow of the resultant water stream to individual crop beds,
control means monitoring the volumetric flow of said water stream and selectively pulsing each of said dosing pump means to inject quantities of the liquid fertilizer to achieve desired proportions and concentrations of said nutrients in the resultant water stream,
said control means including means to vary the proportions and concentrations of the liquid nutrients in the resultant water stream by varying the relative number and timing of pulses of the pump means for each nutrient tank means without changing the pre-set volumetric dose for said pump means,
said control means further including means to control said valve means to distribute the resultant water stream to each crop bed customized for the particular crop bed as to preselected time of distribution, volume and proportions and concentrations of the nutrients in the resultant water stream.

16. A system as claimed in claim 15 wherein each dosing pump means include calibration means to vary the volumetric dose injected on each pulse of the pump means.

17. A system as claimed in claim 16 wherein said dosing pump means are pulsed by directing thereto a single electrical signal.

18. A system as claimed in claim 16 wherein said pulse means are pulsed by application of a temporary hydraulic pulse of increased pressure, said hydraulic pulse being provided by electrical activation of solenoid valves to temporarily apply hydraulic pressure from a water line to the pump means.

* * * * *